United States Patent [19]

Hudecek et al.

[11] Patent Number: 4,461,847

[45] Date of Patent: Jul. 24, 1984

[54] METHOD FOR PRODUCING THIN-WALLED ARTICLES FROM PLASTIC OR RUBBER

[75] Inventors: Slavko Hudecek; Jaroslav Hnidek; Viktor Heidingsfeld; Jan Kolarik; Jiri Zelinger, all of Prague, Czechoslovakia

[73] Assignee: Ceskoslovenska akademie ved., Prague, Czechoslovakia

[21] Appl. No.: 341,905

[22] Filed: Jan. 22, 1982

Related U.S. Application Data

[63] Continuation of Ser. No. 837,144, Sep. 28, 1977, abandoned, which is a continuation-in-part of Ser. No. 496,370, Aug. 12, 1974, abandoned, which is a continuation of Ser. No. 210,401, Dec. 21, 1971, abandoned.

[30] Foreign Application Priority Data

Dec. 23, 1970 [CS] Czechoslovakia .................... 8763-70

[51] Int. Cl.$^3$ .................... C08D 5/20

[52] U.S. Cl. .................... 521/27; 521/28; 521/29; 521/51

[58] Field of Search .................... 521/27, 28, 29, 51

[56] References Cited

U.S. PATENT DOCUMENTS

| | | | |
|---|---|---|---|
| 2,681,319 | 6/1954 | Bodamer | 521/28 |
| 2,681,320 | 6/1954 | Bodamer | 521/28 |
| 2,972,586 | 2/1961 | Van der Neut | 521/28 |
| 3,627,703 | 12/1971 | Kojima | 521/28 |
| 3,876,565 | 4/1975 | Takashima | 521/28 |
| 3,928,704 | 12/1975 | Heidingsfeld | 428/310 |

*Primary Examiner*—Maurice J. Welsh

*Attorney, Agent, or Firm*—Murray Schaffer

[57] ABSTRACT

An unfoamed permeable material, which absorbs and desorbs moisture satisfactorily and which is suitable for making thin-walled articles having a maximum thickness of 3 mm, is based on plastic and/or rubber mixtures containing macromolecular hydrophilic fillers. The hydrophilic fillers are synthetic, water insoluble, cross-linked macromolecular materials containing pendent polar groups, which are able to bind water reversibly, e.g. hydroxy, amine, amide, carboxylic and sulfonic groups in $H^+$, $Na^+$, $K^+$, $Li^+$, $Ca^{++}$, or $Ba^{++}$ form, or quaternary ammonium groups in $CH^-$, $Cl^-$ or $HSO_4^-$ form.

3 Claims, 1 Drawing Figure

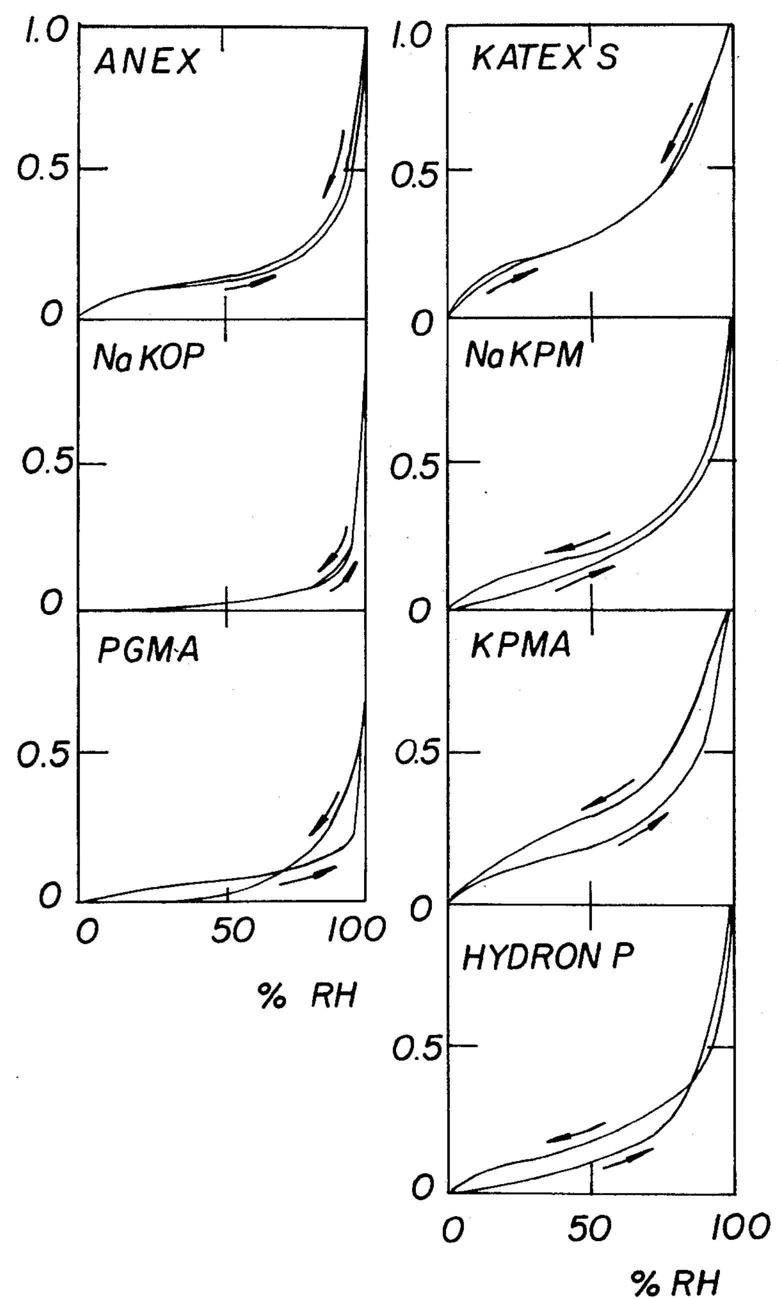
ANEX
NaKOP
PGMA
KATEX S
NaKPM
KPMA
HYDRON P
1.0
0.5
0
50
100
% RH

METHOD FOR PRODUCING THIN-WALLED ARTICLES FROM PLASTIC OR RUBBER

This is a continuation of Ser. No. 837,144, filed Sept. 28, 1977, abandoned, which was a continuation-in-part of Ser. No. 496,370, filed. Aug. 12, 1974, abandoned, which was a continuation of Ser. No. 210,401, filed. Dec. 21, 1971, abandoned.

BACKGROUND OF THE INVENTION

Thin-walled articles, e.g. foils or other sheets, having a maximum thickness of 3 mm, form a considerable part of the product assortment of the rubber and plastics industry. The aforesaid flat articles may be formed from only one polymeric or rubber component or from their various mixtures. They can be, in addition, single-layer or multilayer, and the further layers may be formed again from polymers or rubber, or from various supports, as for instance woven or non-woven fabrics, etc. The physical, mechanical and chemical behavior of the aforesaid articles is influenced by the types of components used and by their finishing.

A great deal of the production of foils and other thin sheets represents artificial leathers, which are not only up to, but even surpass the natural material in appearance and in many physio-mechanical properties. The low sorption of water (Absorptivity) and the small or non-existent water vapor permeability prevent the broad application of previous artificial leathers in shoe and glove making, although these properties are advantageous in other areas of application, e.g., in the packaging industry. Rubber sheeting has similar unsuitable properties for use in the shoe industry, glove making, etc.

Numerous methods have been tried in order to gain the desired permeability, from the purely mechanical ones (e.g. perforating) to those affecting the microstructure of the articles formed (microporous materials, poromers). These methods are conventional and may be used for practically all types of macromolecular materials. One of the methods for the preparation of permeable materials is the incorporation of soluble inorganic salts (NaCl) or organic compounds (sugars). These components are removed either in the formation of the article or in subsequent operations by washing with a suitable solvent (usually with water), thereby leaving cavities or channels and providing permeability for water vapor.

Certain improvements in the absorptivity of the plastic and rubber foils can be achieved by the dressing thereof with hydrophilic agents, e.g. vegetable proteins, some water-soluble polymeric materials, as for example poly(ethylene oxide), etc. However, such a treatment is mostly effective for a limited period of time only.

SUMMARY OF THE INVENTION

The invention relates to a method for producing unfoamed, thin-walled articles having a maximum thickness of 3 mm, from a hydrophobic, non-ionogenic plastic or rubber carrier by calendering, casting, coating, dipping, extrusion, coagulation or pressing, wherein a hydrophilic filler or mixture of hydrophilic fillers consisting of synthetic water-insoluble covalently cross-linked macromolecular material is added to the carrier (e.g., to the macromolecular compound itself, or to its combination with the usual additives, such as plasticizers, stabilizers, dyes, pigments, etc., or to a mixture of macromolecular compounds either with or without the usual additives) and wherein the aforesaid macromolecular fillers contain pendent polar groups able to bind water reversibly, (i.e., physically) preferably hydroxy groups, amine groups, amide groups, carboxylic or sulfonic groups in $H^+$, $Na^+$, $K^+$, $Li^+$, $Ca^{++}$ or $Ba^{++}$ form, respectively, or quaternary ammonium groups in $CH^-$, $Cl^-$, or $SO_4H^-$, or similar form. The binding capacity is a minimum of 20% by weight of water, based on the weight of the dry filler. The amount of filler present is about 10–50% by weight, based on the total weight of filler and carrier, and forms with the carrier a relatively dense, non-foamed structure.

DESCRIPTION OF THE PREFERRED EMBODIMENTS

According to the invention, suitable macromolecular fillers include poly(hydroxyethyl methacrylate), poly(-glyceryl monomethacrylate), poly(trimethylammonium hydroxypropyl methacrylate) and their copolymers, poly(acrylic acid), poly(methacrylic acid), amides or salts of the afore-mentioned polyacids, which are appropriately cross-linked to provide infusible and insoluble polymers as well as ion exchange resins consisting of sulfonated styrene-divinylbenzene copolymers and copolymers of methacrylic acid cross-linked with divinylbenzene, ethyleneglycol dimethacrylate, or other cross-linking agent, and also anion exchange resins containing quaternary ammonium groups, such as trimethylammonium, benzyldimethylammonium, etc.

The ability to absorb water vapor reversibly is the important property of the aforementioned macromolecular compound containing pendent polar groups. The sorption isotherms, as they are shown in the appended figure, are very favorable, as the amount of sorbed water substantially increases with increasing relative humidity in the region from 50 to 100% of relative humidity. The figure shows the sorption isotherms of some of the aforesaid macromolecular compounds which contain the following pendent polar groups: Hydroxy-poly(glycol monomethacrylate), PGMA with 1% of cross-linking agent and Hydron P with 20% of cross-linking agent; carboxylic in $H^+$ form-poly(methacrylic acid), KPMA with 20% of cross-linking agent; carboxylic in $Na^+$ form-sodium salt of poly(methacrylic acid), NaKPMA: hydroxy and carboxylic in $Na^+$ form-sodium salt of glycol monomethacrylate-methacrylic acid copolymer, NaKOP; benzyldimethylammonium in $Cl^-$ form-Anex; and sulfonic groups in $Na^+$ form-sodium salt of sulfonated styrene-divinylbenzene copolymer, Katex S. The values of relative humidity are plotted on the x-axis, the relative sorptions (the sorption at 100% relative humidity is 1) on the y-axis.

The particle size of the filler is generally important. With our fillers and for our purposes, it has been established that particle sizes below 50$\mu$, and down to 0.1$\mu$, are most advantageous. These particles sizes are preferably achieved for example, according to Czechoslovak Patent Number 138,856 (British Pat. No. 1,156,116; U.S. Pat. No. 3,583,957) directly during polymerization under suitable conditions.

The density of the products of this invention is maintained within the range of from 350 to 1500 kg/m$^3$, largely dependent on the copolymer used.

The method according to the invention is simple and may be advantageously used in the fabrication of unfoamed; thin-walled articles having a maximum thickness of 3 mm from plastics, as for example foils, hollow articles, gloves, artificial leather, upholstery materials, etc., as well as in manufacturing rubber articles, for example in shoe and glove making. The method according to the invention provides permeable materials which satisfactorily absorb and desorb body moisture. Their permeability and sorption capacity may be controlled by the amount and type of the hydrophilic filler used.

The following examples further illustrate the invention without, however, limiting its scope. All amounts are given in parts by weight.

EXAMPLE 1

A pressure plasticizer machine was charged with a mixture of 100 parts of butadiene-acrylonitrile copolymer (containing 40% of acrylonitrile), 50 parts of kaolin, 55 parts of ZnO, 40 parts of poly(ethyleneglycol monomethacrylate) cross-linked with 20% of divinylbenzene, 1 part of thiourea, 1 part of stearic acid, 3 parts of titanium white and 0.5 part of a pigment. The mixture was plasticized for 5 minutes at 120° C. and then the plasticizer machine was discharged into a mixing two-roll mill, where the mixture was blended with 3 parts of tetramethylthiuram disulfide and drawn into a slab 8–10 mm thick and having a density of 900–1000 kg/m$^3$. This stock mixture was put on a backing cloth in a four-roll calender. The fabric with the layer applied was heated and vulcanized at 145° C. for 10 minutes. The final material is used for the fabrication of protective clothing.

EXAMPLE 2

Two mixtures were prepared by the method described in Example 1:

I. 100 parts of butadiene-acrylonitrile copolymer (40% of acrylonitrile), 50 parts of kaolin, 5 parts of ZnO, 40 parts of styrene-divinylbenzene cation exchange resin, 1 part of thiourea, 1 part of stearic acid.

II. 100 parts of butadiene-acrylonitrile copolymer (40% of acrylonitrile), 50 parts of kaolin, 5 parts of ZnO, 1 part of thiourea, 1 part of stearic acid, 3 parts of $TIO_2$ and 0.5 part of a pigment.

The slabs prepared after addition of an accelerator were cut into pellets (having a density of 900–1000 kg/m$^3$) which were dissolved in a mixture of butyl acetate and toluene. The solutions were prepared in an arm blender. The solutions contained about 10% of dry substance and were fed into a spreading machine. Two layers of the solution formed from mixture I and two layers formed from mixture II were put on a backing fabric. The solvents were evaporated and the deposit was patterned and vulcanized. The material formed is suitable e.g. for fabrication of overalls, etc.

EXAMPLE 3

A vessel furnished with a stirrer was charged with 100 parts of dimethylformamide solution of poly(vinyl chloride) (K=60) containing 20% of dry substance, 300 parts of dimethylformamide solution of polyurethane—polyester type of rubber, and 16 parts of the powdery terpolymer of methacrylic acid, methacrylamide and ethyleneglycol dimethacrylate (3:2:1) in $Na^+$ form. The mixture was vigorously stirred and then put on a polyester backing fabric, which was led through a water bath. The foil thus prepared had a microporous structure and after washing, drying and surface finishing gave a material suitable as the upper plastic leather for shoe making. The product of this Example, i.e., without the backing fabric, had a density of 400–700 kg/m$^3$, and a thickness of 0.5–1.0 mm.

EXAMPLE 4

A mixture was prepared from 30 parts of suspension poly(vinyl chloride) (K=65), 70 parts of ethylene—vinylacetate copolymer grafted with vinyl chloride (containing 50% of the original ethylene-vinyl acetate copolymer), 10 parts of dioctyl phthalate, 1 part of cadmium stearate, 1 part of barium stearate, 3 parts of $TIO_2$, 0.5 part of glycerine monooleate, 20 parts of benzyldimethylammonium anion exchange resin on the basis of polystyrene in $Cl^-$ form, and 0.1–0.5 part of a pigment. The single components were metered into a fluid blender and there mixed with the temperature increasing up to 120° C. The mixture was then cooled down to 40° C. at decreased revolutions and metered into a continuous plasticizer machine which supplied the four-roll caldender. The calendered foil having a thickness of about 0.8 mm and a density of 1100–1200 kg/m$^3$ is suitable after patterning or other surface finishing for shaping of shoe uppers. Copolymers of vinyl chloride with 10% of vinyl acetate, vinyl chloride with octyl acrylate, vinyl chloride with propylene, and vinyl chloride with vinylidene chloride may be used instead of the suspension poly(vinyl chloride).

EXAMPLE 5

Composition I: 10 parts of dioctyl phthalate, 2 parts of epoxidized soya bean oil, 10 parts of sulfonated styrene-divinylbenzene copolymer in $Ca^{++}$ or $Ba^{++}$ form, 1 part of titanium white, 0.5 part of a pigment.

Composition II: 60 parts of emulsion poly(vinyl chloride) (K=70), 10 parts of dioctyl phthalate, 20 parts of dioctyl sebacate. The mixture of composition I is blended in a ball mill to give a homogeneous paste. The paste is homogenized with the paste made from poly(vinyl chloride) and plasticizers (composition II). The resulting paste can be employed, after deaeration, for dipping or coating and worked out by gelatination in the conventional manner. The material thus prepared has a density of 1000–1100 kg/m$^3$ and may be surface finished by printing, patterning or coating and used in readymade clothes and dipped shoe manufacturing.

What is claimed:

1. An artificial leather for footwear and clothing comprising an unfoamed thin-walled material having a maximum thickness of 3 mm and a density in the range from 350 to 1500 kg/m$^3$ comprising a plastic or rubber carrier having uniformly dispersed within said carrier between 10 and 50 percent by weight of finely divided particles, below 50$\mu$ in size, of a polymeric ionic organic hydrophilic macromolecular filler, said polymeric filler being covalently crosslinked sufficient to render the same infusible and insoluble in said carrier, said filler being insoluble in water, said filler containing pendent polar groups selected from the group consisting of carboxylic and sulfonic groups in $H^+$, $Na^+$, $K^+$, $Li^+$, $Ca^{++}$ and $Ba^{++}$, quaternary ammonium groups in $OH^-$, $Cl^-$, or $SO_4H^-$ form, said polymeric filler being able to bind water reversibly and being selected from the group consisting of ethylene glycol monomethacrylatemethacrylic acid copolymer, the terpolymer of methacrylic acid, methacrylamide and ethylene glycol dimethacrylate, poly(acrylic acid), poly(methacrylic acid), and sulfonated styrene-divinylbenzene copolymers and having a minimum vapor binding capacity of 20 percent by weight of water based on the weight of said filler in the dry state.

2. The article of claim 1, wherein said filler is a terpolymer of methacrylic acid, methacrylamide and ethyleneglycol dimethacrylate in $Na^+$ form.

3. The method of forming artificial leather for footwear and clothing comprising the steps of forming a mixture of a plastic or rubber carrier having uniformly dispersed within said carrier between 10 and 50 percent by weight of finely divided particles, below 50μ in size, of a polymeric ionic organic hydrophilic macromolecular filler, said polymeric filler being covalently cross-linked sufficient to render the same infusible and insoluble in said carrier, said filler being insoluble in water, said filler containing pendent polar groups selected from the group consisting of carboxylic and sulfonic groups in $H^+$, $Na^+$, $K^+$, $Li^+$, $Ca^{++}$ and $Ba^{++}$, quaternary ammonium groups in $OH^-$, $Cl^-$, or $SO_4H^-$ form, said polymeric filler being able to bind water reversibly and being selected from the group consisting of ethylene glycol monomethacrylate-methacrylic acid copolymer, the terpolymer of methacrylic acid, methacrylamide and ethylene glycol dimethacrylate, poly(acrylic acid), poly(methacrylic acid), and sulfonated styrene-divinylbenzene copoymers and having a minimum vapor binding capacity of 20 percent by weight of water based on the weight of said filler in the dry state, and thereafter forming said mixture into an unfoamed, thin-walled sheet having a maximum thickness of 3 mm and a density in the range of from 350 to 1500 $kg/m^3$.

* * * * *